Apr. 3, 1923.
C. SIEPER
HAMMERING MACHINE
Filed July 31, 1916
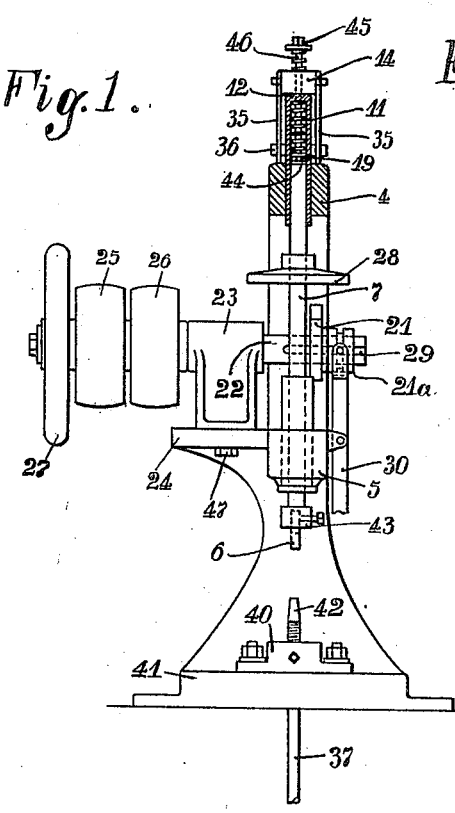
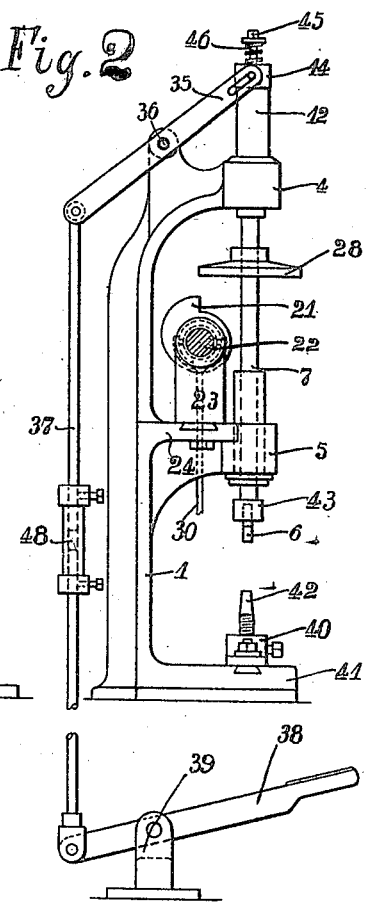
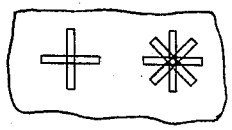
Witnesses:
Carl Sonnet
August Pesch.
Inventor:
Conrad Sieper Patented Apr. 3, 1923.

1,450,895

UNITED STATES PATENT OFFICE.

CONRAD SIEPER, OF KRAWINKELERBRUCKE, GERMANY.

HAMMERING MACHINE.

Application filed July 31, 1916. Serial No. 112,426.

(GRANTED UNDER THE PROVISIONS OF THE ACT OF MARCH 3, 1921, 41 STAT. L., 1313.)

*To all whom it may concern:*

Be it known that I, CONRAD SIEPER, a citizen of the German Empire, and resident of Kräwinkelerbrücke, have invented a new and useful Hammering Machine (for which I have filed applications for patent in Germany March 25, 1914, Patent Nr. 289415; Austria, May 9, 1916, Patent No. 75425; Hungary, May 10, 1916, Patent No. 73226; Switzerland, June 13, 1916, Patent No. 73818; France, July 1, 1916, Patent No. 513004; Denmark, June 14, 1916, Patent No. 22301; Belgium, June 19, 1916, Patent 271254; Italy, July 12, 1916, Patent No. 155185; Sweden, June 16, 1916, Patent No. 43544), of which the following is a specification.

My invention relates to hammering machines for riveting and similar other purposes of the type in which the tool-carrier spindle is pressed downwardly by a spring and lifted at intervals by means of a rotary cam coacting with a friction disc fastened to said spindle, the cam thereby simultaneously turning the spindle in order, for example, to produce a nice round or hemispherical rivet head.

The main object of my invention is on the one hand to regulate the amount of rotation of the spindle according to the requirements of the work to be done, and on the other hand to avoid the turning of the spindle if desired, for example, when rivet heads of quadratic or similar shape are to be produced.

Another object of my invention is to provide means whereby, preferably with the aid of a treadle-lever, not only the spindle may be lowered and lifted relative to the rotary cam to put the hammer at and out of work, but also, simultaneously, the tension of the spring which presses the spindle downwardly can be regulated according to the pressure required.

With these objects in view, my invention consists in the novel arrangements and combination of parts fully described in the following specification and pointed out in the claims, reference being had to the accompanying drawings, in which:—

Fig. 1 is a front elevation, partly sectional, of my new machine,

Fig. 2 is a side elevation, and

Fig. 3 is a diagram showing how a crown like rivet-head may be produced.

Referring to Figs. 1 and 2, the frame of the machine which, in the example shown, is intended to be arranged on the work table or bench comprises a base plate 41 and a standard 1 erected on the rear end of said base plate. At its front part, the base plate 41 carries an anvil 40 adapted to adjustably and exchangeably hold a riveting-knob 42. The standard 1 has two forwardly extending brackets 4 and 5 in which is slidably and rotatably journalled a spindle 7 fitted at its lower end with a socket 43 in which is also exchangeably held a tool 6, for instance, a riveting set. Near its upper end the spindle 7 is surrounded by a coiled spring 11 tending to press the spindle downwardly. Said spring is encased by a sleeve 12 and rests with its lower end, preferably on an intermediate ball bearing 19, against a shoulder 44 of the spindle 7, while its upper end bears against a cross head 14 slidably mounted on the spindle 7. Above said cross-head 14 the spindle 7 carries an adjustable abutment 45, for instance a nut and counter nut, between which and the cross head I prefer to arrange a small coiled spring 46. To the cross head 14 a pair of double armed levers 35, 35 fulcrumed at 36 to the standard 1 is linked, said levers being, by means of a connecting rod 37 which at the same time carries a counterweight 48, coupled with a treadle lever 38 pivoted to a trestle 39 on the floor. The counterweight 48 serves to normally lift the spindle 7 by means of the cross-head 14 and the abutment 45, whereby the spring 11, of course is expanded, while the spindle 7 may be lowered and simultaneously said spring compressed by operating the treadle lever 38.

Between the two brackets 4 and 5 a friction disc 28 is fixed to the spindle 7, and coacting with this disc 28 is a cam 21 mounted on the inner end of a shaft 22 journalled in a bearing 23 and carrying at its other end the fast and loose pulleys 25, 26 and a fly wheel 27. According to my invention the axis of the shaft 22 which forms the axis of rotation of the cam 21 lies parallel with the chord of the friction disc 28, while the cam 21 is adjustable in the direction of said chord. For the latter purpose the shaft 22 with the cam 21, the pulleys 25, 26, the fly wheel 27 and the bearing 23 may as a whole be adjustable in the direction of said shaft, and in the example shown, the bearing 23 is by its dovetailed base slidably mounted on a bed plate 24 provided on the bracket 5, while it can be fastened in every position with the aid of a clamping screw 42. By these means I am enabled to vary the position of the cam 21 with respect to the friction discs 28 in such a manner that the cam 21 on lifting the friction disc 28 simultaneously imparts rotation thereto about any desired angle, or it lifts the discs 28 without rotating the same.

When a frequent adjustment of the cam is necessary, I prefer to make the cam 21 adjustable with respect to the shaft 22. To this end the cam 21, having in this instance an elongated hub 21$^a$ is by means of featherkey and groove 29 axially displaceably but nonrotatably coupled to the shaft 22, a lever 30 pivoted to the bracket 5 and engaging a circumferential groove in the hub 21$^a$ being provided for shifting the cam on the shaft 22. The lever 30 may if desired be connected to a treadle not shown.

Supposing that the belt (not shown) is on the fast pulley 25 and the cam 21 in the position shown in Fig. 1, the operation of the machine is as follows: On depressing the treadle-lever 38 the spindle 7 is lowered until the friction disc 28 rests upon the cam 21, whereupon the spring 11 is compressed. The rotary cam 21 at certain intervals lifts the spindle 7 which then is suddenly lowered by the action of the spring 11 causes a blow of the tool 6 upon the work. On lifting the spindle 7 the cam 21 each time imparts a certain rotary motion to the spindle 7 thereby turning the tool 6 after each stroke as is desirable, for instance, for the production of a nice round rivet head. By more or less depression of the treadle lever 38 the tension of the spring 11 may be varied and thus the force of the blow of the tool regulated according to the work to be done.

When a crown like rivet head is to be produced by means of a chisel-like tool to be turned after each stroke about a predetermined angle (see the diagram in Fig. 3 which shows two examples of the several positions of such a tool) the cam 21 may readily be adjusted to the position in which it imparts the required angular movement to the spindle 7.

Finally when the tool is not to be turned, for instance, in producing square shaped articles, the cam 21 may be adjusted so that its vertical plane coincides with the radius of the friction disc. In this position it is evident, that the cam 21 does not rotate the spindle 7 at all.

Of course, according to the work to be done, a tool of the proper shape has to be fastened to the lower end of the spindle 7.

Many alterations or modifications of the new machine may suggest themselves to those skilled in the art. Therefore I wish to state that I do not limit myself to the precise details or arrangements of parts shown on the annexed drawing, but I hold myself at liberty to alter or modify the same without departing from the spirit of my invention as defined in the claims.

What I claim and desire to secure by Letters Patent is:

1. In a hammering machine, in combination: a tool-carrier spindle movable up and down, a spring pressing said spindle downwardly, a friction disc fastened to said spindle, and a rotary cam coacting with said friction disc for lifting said spindle at intervals and simultaneously turning said spindle, the rotating axis of said cam lying parallel with a chord of said friction disc, and said cam being adjustable with respect to said friction disc in the direction of said chord.

2. In a hammering machine, in combination: a tool-carrier spindle movable up and down, a spring pressing said spindle downwardly, a friction disc fastened to said spindle, a shaft, and a rotary cam on said shaft, coacting with said friction disc, said cam being displacably but non-rotatably mounted on said shaft, the axis of which lies parallel with a chord of said friction disc, and a lever coupled to said cam for adjusting the said cam longitudinally on said shaft.

3. In a hammering machine, in combination: a tool-carrier spindle movable up and down, a spring pressing said spindle downwardly, a friction disc fastened to said spindle, a rotary cam coacting with said friction disc, and means for lowering and lifting said spindle with said friction disc relatively to said rotary cam, said means simultaneously regulating the tension of said spring.

4. In a hammering machine, in combination: a tool-carrier spindle movable up and down, a spiral spring surrounding said spindle and pressing it downwardly, a friction disc fastened to said spindle, a rotary cam coacting with said friction disc, a cross-head slidable on said spindle and forming an abutment for said spring, a stop fastened to said spindle above said cross-head, a double-armed lever linked to said cross-head and coupled by a rod to a treadle-lever, said lever-system being adapted to lower said spindle with said friction disc relative to said rotary cam and simultaneously to span said spring and to regulate its tension, and a counter-weight adapted to lift said spindle and simultaneously to release the tension of said spring.

In testimony whereof I affix my signature in presence of two subscribing witnesses.

CONRAD SIEPER. [L. S.]

Witnesses:
 HELEN NUFER,
 ALBERT NUFER.